DEFENSIVE PUBLICATION

UNITED STATES PATENT AND TRADEMARK OFFICE

Published at the request of the applicant or owner in accordance with the Notice of Dec. 16, 1969, 889 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 12

T940,023

PIPE REACTOR-CONTINUOUS AMMONIATOR PROCESS FOR PRODUCTION OF GRANULAR PHOSPHATES

Gordon C. Hicks, 3307 19th Ave., Sheffield, Ala. 35660, and Fred E. Lancaster, Jr., Killen, Ala. 35645

Filed Oct. 24, 1974, Ser. No. 517,452
Int. Cl. C05b 7/00
U.S. Cl. 71—34
1 Sheet Drawing 13 Pages Specification

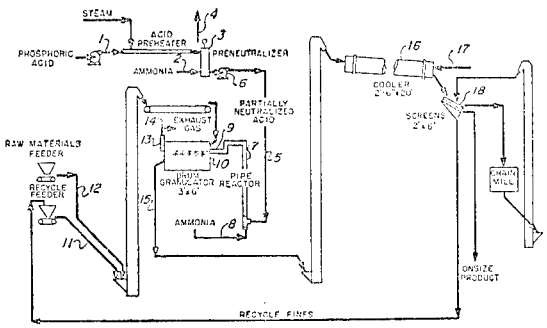

FLOW DIAGRAM OF GRANULATION PILOT PLANT USING PIPE REACTOR PROCESS FOR NPK FERTILIZERS

Process for production of granular mixed fertilizer in which ammonium phosphate melt is prepared in a pipe reactor and dispersed through a plurality of apertures in the wall of the pipe as a fine spray which serves to bind small particles of fertilizer materials into granules. Such fertilizer materials can include potassium chloride, single superphosphate, and urea, as well as others common to the industry. Wet-process orthophosphoric acid typically containing 54 percent $P_2O_5$ is ammoniated to an $$NH_3:H_3PO_4$$

mole ratio of about 1.0 and the steam formed by the heat of reaction atomizes the ammonium phosphate melt very effectively, resulting in proper distribution of the melt for granulation of the small particles. The present invention is a result of a continuation of Meline's work in U.S. Pat. 3,733,191. A simple perforated pipe attached to the discharge end of the inline reactor results in effective disengagement of vapor from the melt and in much improved distribution of the ammonium phosphate melt, thereby further improving the process by eliminating the need for Meline's tube-and-rotor vapor disengager. Up to about 30 percent of the $P_2O_5$ in the melt may to polyphosphate. The melt may be ammoniated from an $NH_3:H_3PO_4$ mole ratio of 1.0 to about 1.2 or higher by addition of ammonia in the granulator. The ammonium phosphate is essentially anhydrous and the granules of mixed fertilizers do not require drying. Elimination of drying greatly decreases investment, dust and fume evolution, and fuel requirement.

PIPE REACTOR-CONTINUOUS AMMONIATOR PROCESS FOR PRODUCTION OF GRANULAR PHOSPHATES
Original Filed Oct. 24, 1974
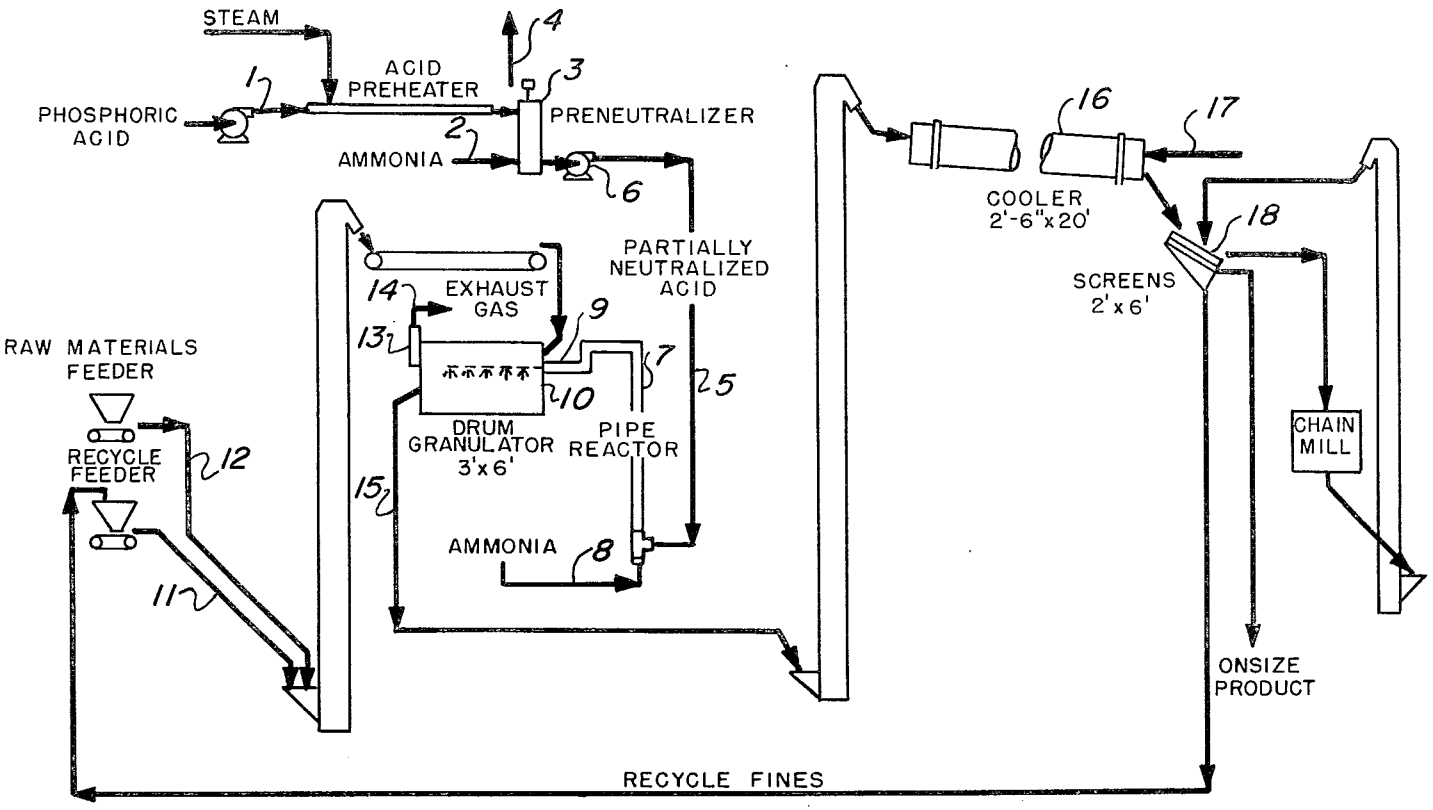
FLOW DIAGRAM OF GRANULATION PILOT PLANT USING PIPE REACTOR PROCESS FOR NPK FERTILIZERS